(No Model.)
F. H. SKRINE.
MEANS FOR CARRYING VELOCIPEDES IN RAILWAY CARS.
No. 603,777. Patented May 10, 1898.
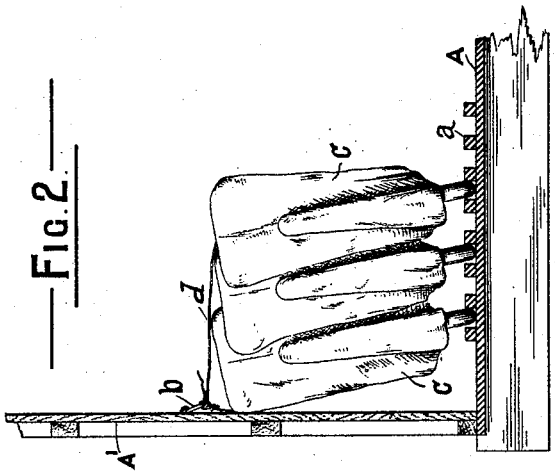
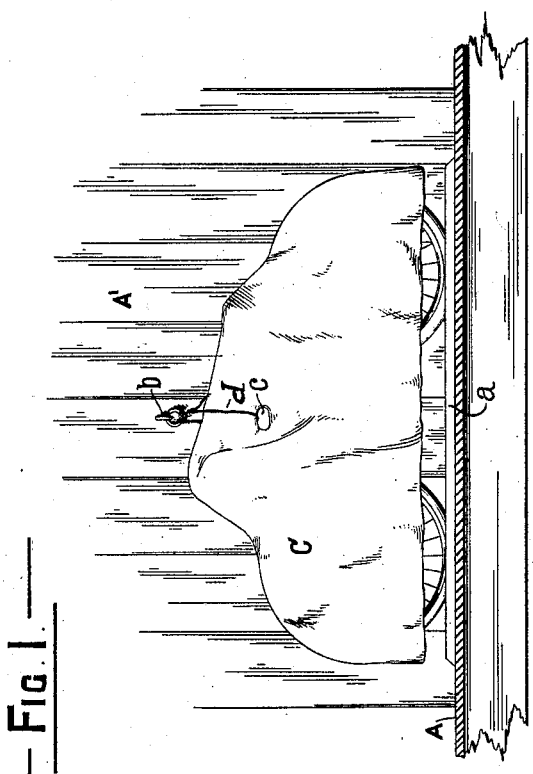
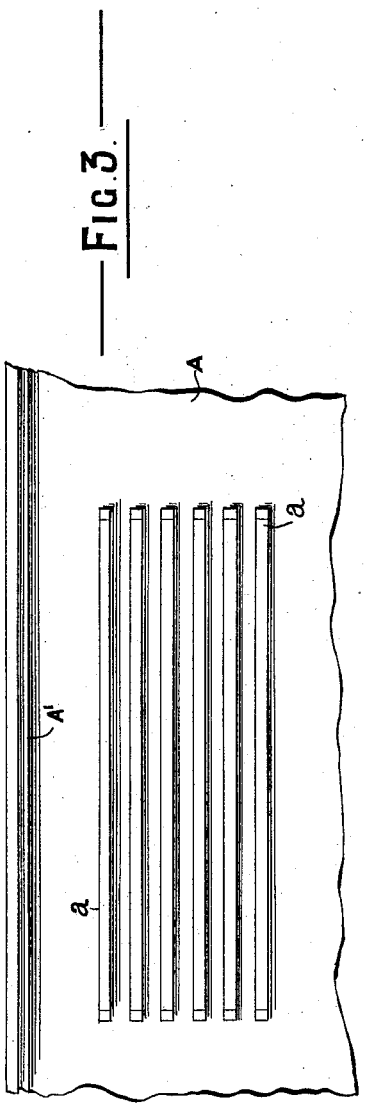
Witnesses:—
Edward Vieser
George Barry Jr.
Inventor
Francis H. Skrine
By attorneys
Brown & Seward

UNITED STATES PATENT OFFICE.

FRANCIS H. SKRINE, OF LONDON, ENGLAND.

MEANS FOR CARRYING VELOCIPEDES IN RAILWAY-CARS.

SPECIFICATION forming part of Letters Patent No. 603,777, dated May 10, 1898.

Application filed November 19, 1897. Serial No. 659,155. (No model.)

*To all whom it may concern:*

Be it known that I, FRANCIS HENRY SKRINE, of Queen Anne's Mansions, Westminster, London, England, have invented certain new and useful Improvements in Means for Carrying Velocipedes in Railway-Cars, of which the following is a specification.

The object of this invention is to provide for the safe carriage of bicycles in railway baggage and other cars.

In the accompanying drawings, Figure 1 shows in longitudinal sectional elevation so much of a railway baggage-car as is necessary to illustrate my invention. Fig. 2 is a transverse section, and Fig. 3 a partial plan view.

A is the floor of the car, and A' the walls thereof.

In carrying out my invention I adapt to the floor of the car a series of bars, rods, or fillets $a\ a$, placed from two to three inches apart and about two inches in height. Between these bars, rods, or fillets $a\ a$ the wheels of the bicycle will be placed, and thus slipping away sidewise on the floor of the car will be prevented. The bicycles can be placed at any convenient inclination, as shown at Fig. 2.

To the wall A' of the car I affix in convenient positions rings or other appliances $b\ b$, to which the bicycles may be secured, as hereinafter described.

For each bicycle I provide a cover C, of canvas or other suitable material, in which I make one or more apertures or eyelet-holes $c$ or to which I attach rings, lengths of cord, or their equivalents, as chains or straps, with spring or other clips, or it may be straps and buckles or other suitable devices, by which the covers may be secured to the bicycles and to the rings or other devices attached to the walls of the car, or it may be the covers of other bicycles. Such covers may be lined with wash-leather and may be padded, if necessary, in parts which come in contact with the bright or varnished parts of the bicycle. In this way scratching and other damage to the parts of the bicycles is prevented. The machines cannot fall over as a result of oscillation or shocks, being prevented from doing so by a cord $d$, passed through the apertures or eyelet-holes in each cover and between the topmost spokes or other part of each machine and attached to one or more of the rings in the wall of the car, or by the mutual interlacing of the cords, clips, or buckles attached to each cover, as described above. These covers may be stamped with distinctive numbers, enabling passengers to identify their machines, and the private labels attached by passengers may also be exhibited through the apertures or eyelet-holes. They may likewise be stamped with the initials or monogram of the railway company.

No structural alteration of any importance in the cars is called for by this invention. Baggage can be placed upon the bars, rods, or fillets, and the car can be used for its ordinary purposes whether bicycles are being carried therein or not.

What I claim is—

The means for carrying and protecting velocipedes in railway-cars, consisting in the combination of bars, rods or fillets placed on the floor of the car to receive the wheels, attaching devices on the walls of the car, covers for the velocipedes provided with openings, and cords passing through the velocipedes and through the openings in their covers and attached to said devices for at the same time securing the velocipedes in place and securing the covers thereon, all substantially as herein described.

FRANCIS H. SKRINE.

Witnesses:
 G. F. WARREN,
 WALTER J. SKERTEN.